United States Patent

Cappon et al.

Patent Number: 5,498,207
Date of Patent: Mar. 12, 1996

[54] FRONT UNIT FOR A FORAGE HARVESTER

[75] Inventors: Wilfried J. M. Cappon, Zedelgem; Pierre E. Teetaert, Koekelare, both of Belgium; Adrianus Naaktgeboren, Varsenare; Cornelis G. M. Muijs, Merelbeke, both of Netherlands

[73] Assignee: New Holland North America, Inc., New Holland, Pa.

[21] Appl. No.: 348,660

[22] Filed: Dec. 1, 1994

[30] Foreign Application Priority Data

Dec. 4, 1993 [EP] European Pat. Off. .............. 93203409

[51] Int. Cl.$^6$ ..................................................... A01F 12/10
[52] U.S. Cl. .......................... 460/119; 460/17; 56/16.4 B; 241/285.3; 241/101.763
[58] Field of Search .............................. 460/17, 113, 119; 56/16.4 A, 16.4 B, 16.4 C, 16.6, DIG. 1, DIG. 9, DIG. 14; 241/101.763, 605, 285.3

[56] References Cited

U.S. PATENT DOCUMENTS

| 3,985,306 | 10/1976 | Wagstaff et al. | 241/222 |
| 4,223,846 | 9/1980 | Priepke et al. | 241/60 |
| 4,278,210 | 7/1981 | Priepke | 241/222 |
| 4,724,661 | 2/1988 | Blakeslee et al. | 56/DIG. 1 X |
| 4,728,046 | 3/1988 | Bruer et al. | 241/101.763 X |
| 4,938,425 | 7/1990 | Williams et al. | 241/101.7 |
| 4,949,535 | 8/1990 | Hurlburt | 56/DIG. 1 X |

FOREIGN PATENT DOCUMENTS

| 0177995 | 4/1986 | European Pat. Off. . |
| 2047233 | 3/1971 | France . |
| 2176737 | 11/1973 | France . |
| 2266452 | 10/1975 | France . |
| 2514230 | 10/1982 | France . |
| 924598 | 3/1955 | Germany . |
| 3330195 | 3/1984 | Germany . |
| WO-A-9111900 | 8/1991 | WIPO . |

*Primary Examiner*—Terry Lee Melius
*Attorney, Agent, or Firm*—Frank A. Seemar; Larry W. Miller

[57] ABSTRACT

A forage harvester is provided with a cutterhead frame (34), mounted on a support (40) which can be pivoted about an cylindric beam (80) at the top thereof. The cutterhead frame (34) can be pivoted about the axis (39) of the cutterhead (36) under the action of hydraulic cylinders (90). Lower feedrolls (26, 27) are installed in a lower feeder frame (24), attached to the cutterhead frame (34), and upper feedrolls (20, 21) are installed in an upper feeder frame (18), which can be tilted forwardly about a cylindric beam (67) attached to the front of the lower feeder frame (24). A coupling arrangement (61, 62) for the coupling of a crop collecting apparatus (10) also serves to support the upper feeder frame (18), when the latter is separated from the lower feeder frame (24). This arrangement (61, 62) enables the attachment of the upper feeder frame (18) to a tractor (110). Thus can be gained access for inspection and servicing between the upper (20, 21) and lower feedrolls (26, 27) and to the cutterhead (36). The support (40) can be secured to the cutterhead frame (34) in order to raise both together and gain access between the cutterhead (34) and the blower rotor (49).

21 Claims, 7 Drawing Sheets

FRONT UNIT FOR A FORAGE HARVESTER

FIELD OF INVENTION

The present invention relates generally to forage harvesters, and more particularly to the front unit thereof, comprising upper and lower feeder means, operable to feed crop material inbetween towards a rotating cutterhead, which is also comprised by the front unit and which chops the incoming crop material.

BACKGROUND OF THE INVENTION

A forage harvester usually is equipped with a detachable crop collecting apparatus, such as a row crop attachment or a pick-up device, which takes the crop off the field and feeds it to the inlet of the front unit of the forage harvester. In order to obtain good chopping quality, i.e. comminution of the crop material to a constant chop length, an even mat of crop material has to be fed at a constant speed towards the cutterhead to be comminuted between the rotating knives of the cutterhead and a stationary shearbar. The chopped material is led to a blower unit with paddles, which throw it up into a discharge spout for collection in a cart or container.

In order to accomplish such constant flow, the crop material is compressed between upper and lower feeder means which have portions lying adjacent the shearbar. This compact construction of the feeder means and the cutterhead hinders access thereto for inspection, cleaning and service operations.

Access to the shearbar and the cutterhead may be required for inspection and adjustment of the shearbar to knife clearance and for replacement of the shearbar or the cutterhead knives.

Access for cleaning and service may be required between the feeder means, which usually comprise sets of feeder rolls. To prevent damage of the cutterhead knives, the feeder means may be equipped with a detector, which is operable to immediately stop the feeder means upon detection of a foreign object. Such detector usually is installed within the front roll of the lower feeder means. Easy servicing and/or replacement of this detector is essential, because of the delicacy of its electronic components. Therefore good accessability to the front roll is required.

The blower unit is mounted between the main frame of the forage harvester and the front unit. Access for cleaning, inspection and/or adjustment of the blower paddles involves splitting between the front unit and the main frame. Currently the whole front unit has to be removed for servicing of the blower, which implies the use of additional hoist equipment such as a tackle or a lift truck. Consequently such operation cannot take place in the field.

U.S. Pat. No. 4,938,425, issued Jul. 3, 1990 in the name of Terry A. Williams, et al, discloses a front unit which comprises a cutterhead frame, supporting a cutterhead and a shearbar, and a feeder section, supporting upper and lower feed rolls. For ready access to the shearbar and the cutterhead knives the feeder section can be swung about a vertical axis. Cleaning of the feeder section is cumbersome. Any crop material between the upper and lower feed rolls remains compressed therebetween by the spring loaded upper feed rolls. Also, no means are provided for providing direct access and easy removal of the front lower feed roll, which remains secluded below the upper front feed roll.

Another feed roll arrangement is shown in U.S. Pat. No. 3,985,306, issued Oct. 12, 1976 in the name of Robert A. Wagstaff, et al. Access to the shearbar can be gained by pivoting the rear feed roll relative to the front feed roll to a service position above the front feed roll. Thereby accessability to the lower feed roll is not improved, as it also remains hidden below the upper feed roll.

Neither of aforementioned documents shows means for easy access between the cutterhead and the blower unit.

These prior art documents do not deal in a satisfactory way with the problems of easy access between the upper and lower means, between the cutterhead and the blower and to the lower feed roll.

Therefore it is an object of the present invention to provide a front unit which comprises a cutterhead portion and feeder portions which are movable relative to one another to improve accessibility therebetween and to the components thereof for inspection, cleaning, adjustment and service operations.

SUMMARY OF THE INVENTION

According to one aspect of the present invention a forage harvester is provided, comprising a main frame, a cutterhead frame mounted thereto and enclosing a rotatable cutterhead, operable to comminute crop material, and upper feeder means and lower feeder means, operable to convey crop material therebetween towards the cutterhead, the lower feeder means being mounted in a lower feeder frame, attached to the cutterhead frame and the upper feeder means being mounted in an upper feeder frame, attached to the lower feeder frame or to the cutterhead frame.

Such forage harvester is characterized in that the upper feeder frame is movable between an operative position in which the upper feeder means lie immediately above the lower feeder means and a service position in which the upper feeder means lie remote from the foremost portion of the lower feeder means.

The upper feeder frame preferably is pivotable about a horizontal axis which extends below the lower feeder means. It comprises means for attachment to a crop collecting apparatus or to the three point hitch of a tractor.

According to another aspect of the present invention a forage harvester is provided, comprising a main frame, a cutterhead frame, tiltably mounted thereto and enclosing a cutterhead, rotatable about a first horizontal axis to thereby comminute crop material, a cutterhead frame, tiltably mounted thereto and supporting a cutterhead for rotation about a first horizontal axis to thereby comminute crop material, upper feeder means and lower feeder means, operable to convey crop material therebetween towards the cutterhead, and means for raising the front portion of the cutterhead frame relative to the main frame.

Such forage harvester is characterized in that the cutterhead frame is mounted to the main frame by means of a cutterhead support, which is journalled for tilting about a second horizontal axis.

Preferably the support is pivotally connected at its top portion to the main frame and is secured from tilting by removable hold means. After inserting a transverse pin through matching holes of the cutterhead frame and the support and after removal of the hold means, the support can be pivoted by the hydraulic cylinder which otherwise raises and lowers the front portion of the cutterhead frame.

A forage harvester in accordance with the present invention will now be described in greater detail, by way of example, with reference to the following drawings.

DESCRIPTION OF THE PREFERRED EMBODIMENT

The terms "front", "rear", "forward", "rearward", "right", and "left" used throughout the specification are determined with respect to the normal direction of movement of the machine in operation.

Figure 1:
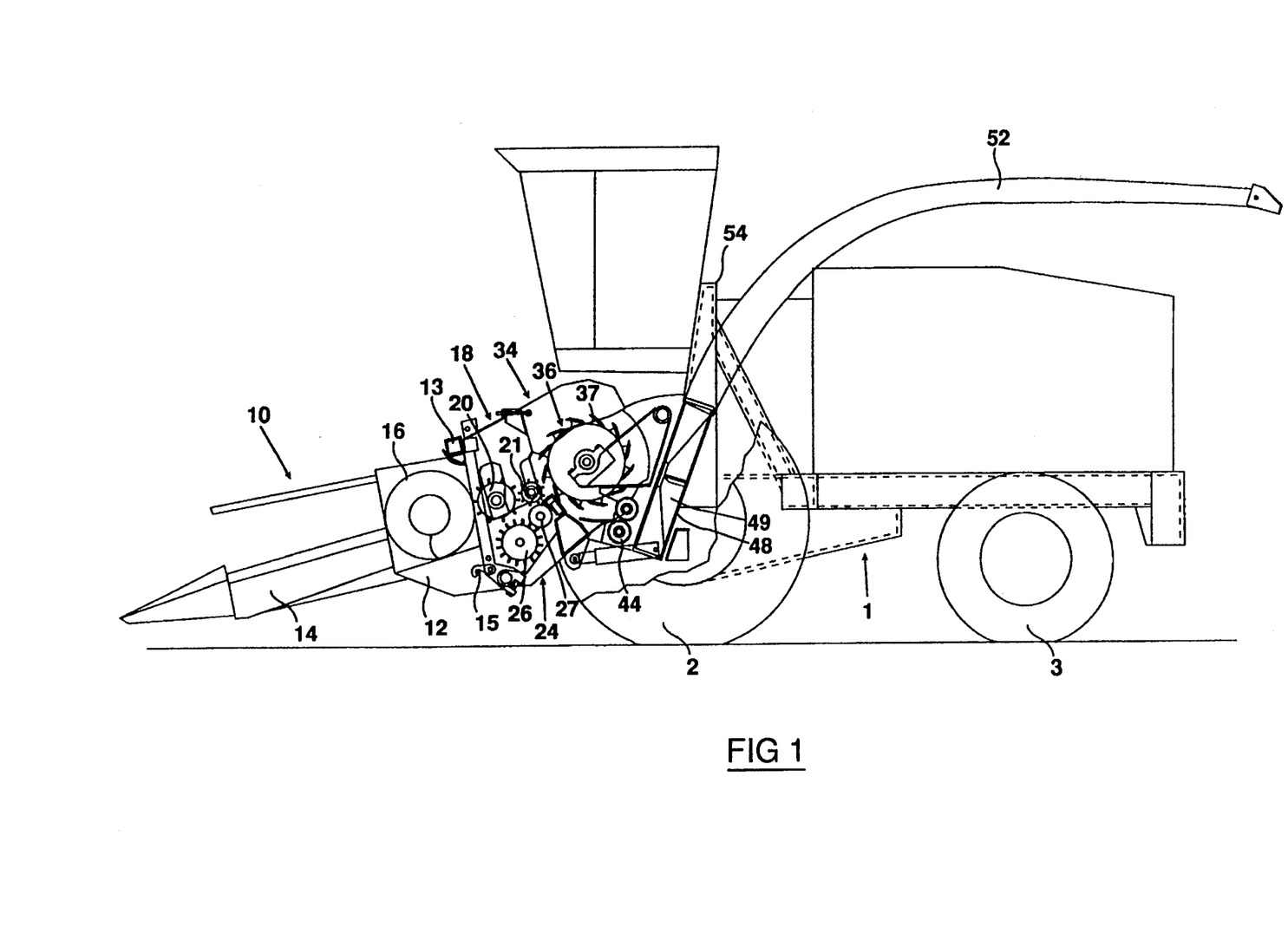
FIG. 1 is a side elevational view of a forage harvester, comprising a front unit mounted to a main frame and a crop collecting apparatus.
Figure 2:
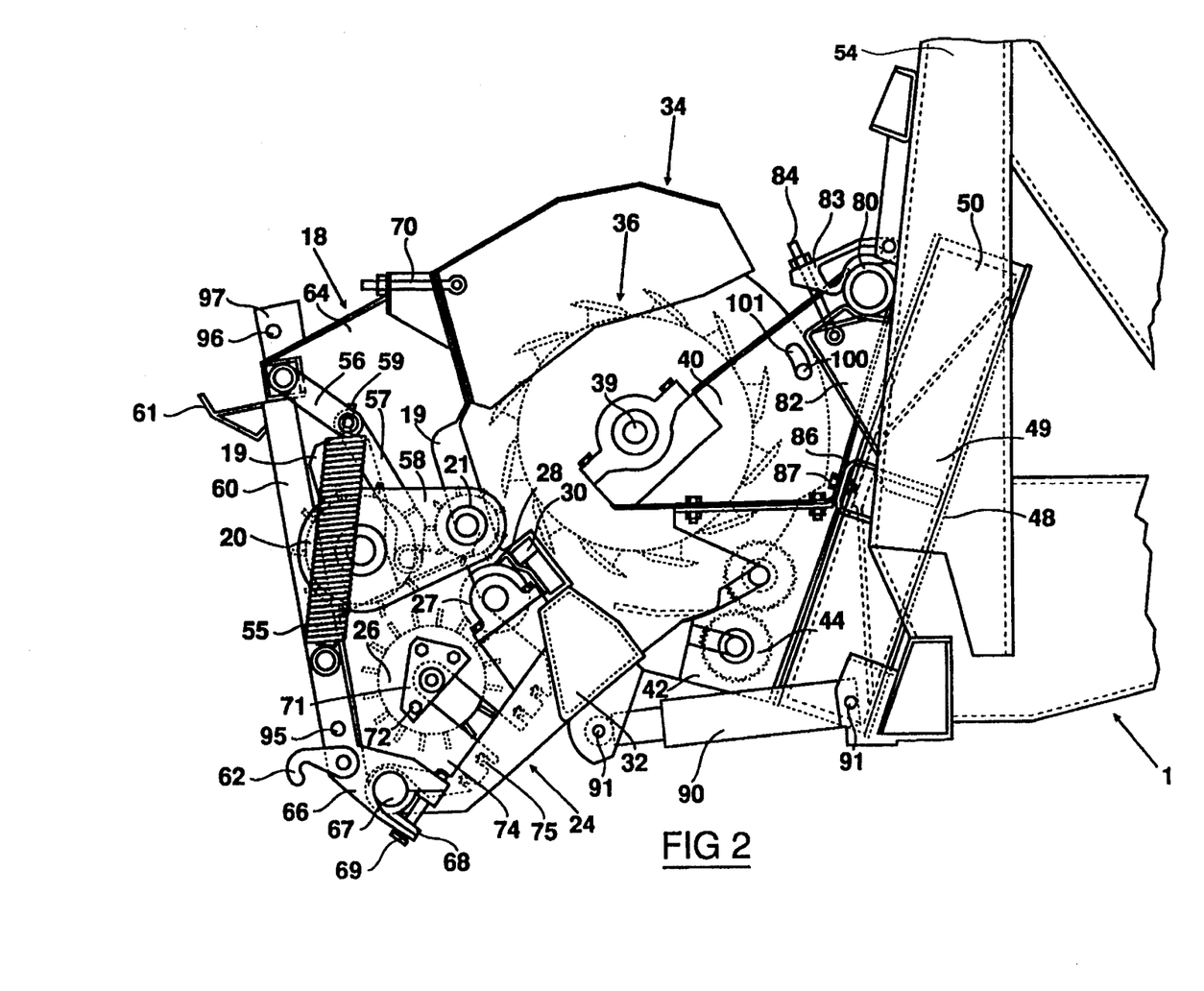
FIG. 2 is an enlarged side view of a portion of the main frame and of the front unit, comprising an upper and lower feeder frame.

With reference to the drawings and more particularly to FIGS. 1 and 2, there is shown a forage harvester having a main frame 1 on which are mounted ground engaging traction wheels 2 and steering wheels 3. The forage harvester is shown equipped with a crop collecting apparatus, in the form of a row crop attachment 10, suitable for the harvesting of corn, but which can be replaced with a conventional windrow pick-up device or a conventional cutter bar attachment, depending on the type of crop to be harvested. Customarily the row crop attachment 10 comprises an attachment frame 12, which supports a plurality of row crop units 14, operable to harvest corn stalks from the field and to convey the same rearwardly to an auger 16 which in its turn delivers the crop material to the bite of feeder means installed in a front unit of the forage harvester.

Such feeder means comprise lower feeder means, constituted by a forward lower feedroll 26, and a smooth, rear lower feedroll 27, and upper feeder means, constituted by an upper forward feedroll 20 and an upper rear feedroll 21. The lower feedrolls 26, 27 are rotatably mounted in a lower feeder frame 24 and the upper feedrolls 20, 21 are mounted in an upper feeder frame 18, to which the row crop attachment 10 is attached. Such upper and lower feeder means rotate to convey the crop material therebetween to a cutterhead 36 which comprise a plurality of knives 37, generating a cylindrical peripheral shape or profile when the cutterhead 36 is rotated. The knives 37 cooperate with a fixed shearbar 30 to cut the crop material to length and project it into the bite of a set of counter-rotating crop processor rolls 44, which crack any kernels which may be left in the chopped material and deliver the whole to a blower rotor 49 which is installed within a blower housing 48, attached to vertical beams 54 of the main frame 1. The blower rotor 49 comprises a plurality of paddles 50, which throw the material upwardly through the blower outlet into a discharge spout 52, which can be positioned by an operator to direct the cut crop material as required, normally into a wagon which is moving alongside or behind the forage harvester.

As shown in FIG. 2, the upper feeder frame 18 comprises two substantially vertical cavities 19 on both sides of the front unit, in which cavities 19 are held the axles of the upper feedrolls 20, 21. The left and right hand ends of said axles are received in bearing housings 58, which are movably linked to the upper feeder frame 18 by sets of hinged arms 57 and 56. The upper arms 56 are mounted for pivotal movement to the upper portion of the upper feeder frame 18 and are forced down by a pair of spring means 55 connected to the arms 56 by adjustment bolts 59. The arms 56, in turn, push the arms 57, the bearing housings 58 and the upper feedrolls 20 and 21 downwards to the lower feedrolls 26, 27. The incoming crop material is compressed by the upper feedrolls 20, 21 in order to deliver an even mat thereof to the cutterhead 36 and the shearbar 30. The compression force on the mat can be adjusted by varying the tension of the spring means 55 with the bolts 59.

The upper feeder frame 18 further comprises a front section 60 which registers with the outlet of the row crop attachment 10. The lower portions of the spring means 55, opposite the adjustment bolts 59 are pivotably attached to the sides of front section 60.

Figure 4:
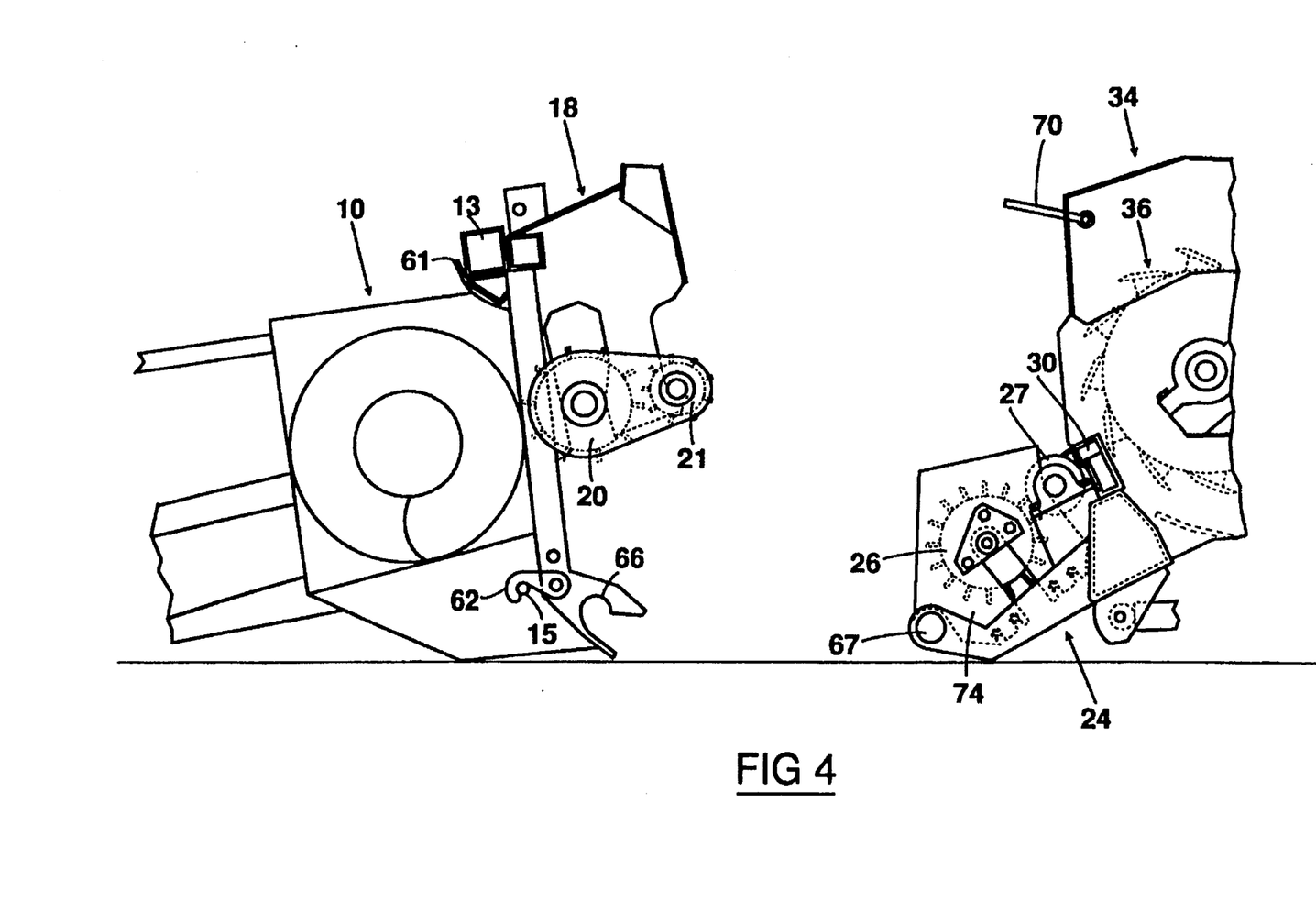
FIG. 4 is a side view of the crop collecting apparatus carrying the upper feeder frame, which has been detached from the front unit.

As seen in FIGS. 1, 2 and 4, the attachment frame 12 comprises a horizontal beam 13, which can be lifted up and held by an attachment rest 61, affixed to the feeder front section 60. The attachment frame 12 further comprises two projections 15 on both sides of the attachment outlet, which can be grasped by a pair of hooks 62 which are pivotally attached to the front section 60. The rest 61 and hooks 62 suffice to secure the attachment 10 to the front unit of the forage harvester.

The lower portion of the front section 60 comprises a pair of bifurcated extensions 66, fitting over a cylindric beam 67, which is affixed to the lower feeder frame 24. The bifurcated extensions 66 are pivotally secured to the beam 67 by means of a pair of locks 68 which fill the space behind the beam 67 and the fingers of the bifurcated extensions 66. The locks 68 are held in place by a pair of pins 69.

The top of the upper feeder frame 18 is held against the cutterhead frame 34 by a pair of eyebolts 70, attached to the sides thereof.

The lower feeder frame 24 is welded to a transverse beam 32 of the cutterhead frame 34. The rear lower feedroll 27 has a smooth surface to which is mounted a scraper 28 for removal of any crop material which may stick to it. To be effective, the clearance between the feedroll 27 and the scraper 28 should be minimal.

The forward lower feedroll 26 may enclose an apparatus (not shown) for the detection of foreign objects. One side of the feedroll 26 is journalled in a fixed side plate (not shown) of the lower feeder frame 24. The other side is journalled in a bearing plate 71, which is affixed by bolts 72 to a side plate 74, which in turn is affixed by bolts 75 to the lower feeder frame 32. The side plate 74 has a slot of which the width corresponds to the journal of the feedroll 26 and which extends between the centre of feedroll 26 and the lower edge of the plate 74.

The shearbar 30 is installed above the transverse beam 32 and is movable relative to the cutterhead 36 for adjustment of the knife-to-shearbar clearance. The cutterhead 36 rotates about an axle 39 which is journalled on a cutterhead support 40 of a generally triangular shape. The assembly of cutterhead frame 34, lower feeder frame 24 and upper feeder frame 18 is mounted for pivotal movement about the same axle 39. The position of this assembly relative to the main frame 1 is controlled by a pair of hydraulic cylinders 90, which are mounted with pins 91 between the transverse beam 32 of the cutterhead frame 34 and the main frame 1. The elongation thereof will pivot the front section 60 of the upper feeder frame 18 upwardly so as to raise the front portion of any attachment 10 coupled thereto. The shortening of the cylinders 90 will pivot section 60 downwardly and lower the front portion of the same attachment 10.

Attached to the base of the cutterhead support 40 is a crop processor frame 42 in which the crop processor rolls 44 are rotatably mounted. The rear portion of crop processor frame 42 registers with the inlet of the blower housing 48. The top portion of the support 40 comprises a transverse, cylindric beam 80 which rests on a pair of protrusions 82 of the vertical beams 54 of the main frame 1. A pair of clamps 83 fit over this cylindric beam 80 to hold the latter on the protrusions 82 and against the beams 54. Eyebolts 84 between the protrusions 82 and the clamps 83 are used to apply a clamping force upon the cylindric beam 80. The lower portion of the support 40 is fastened to the verticals beams 54 by a pair of bolts 87.

Figure 3:
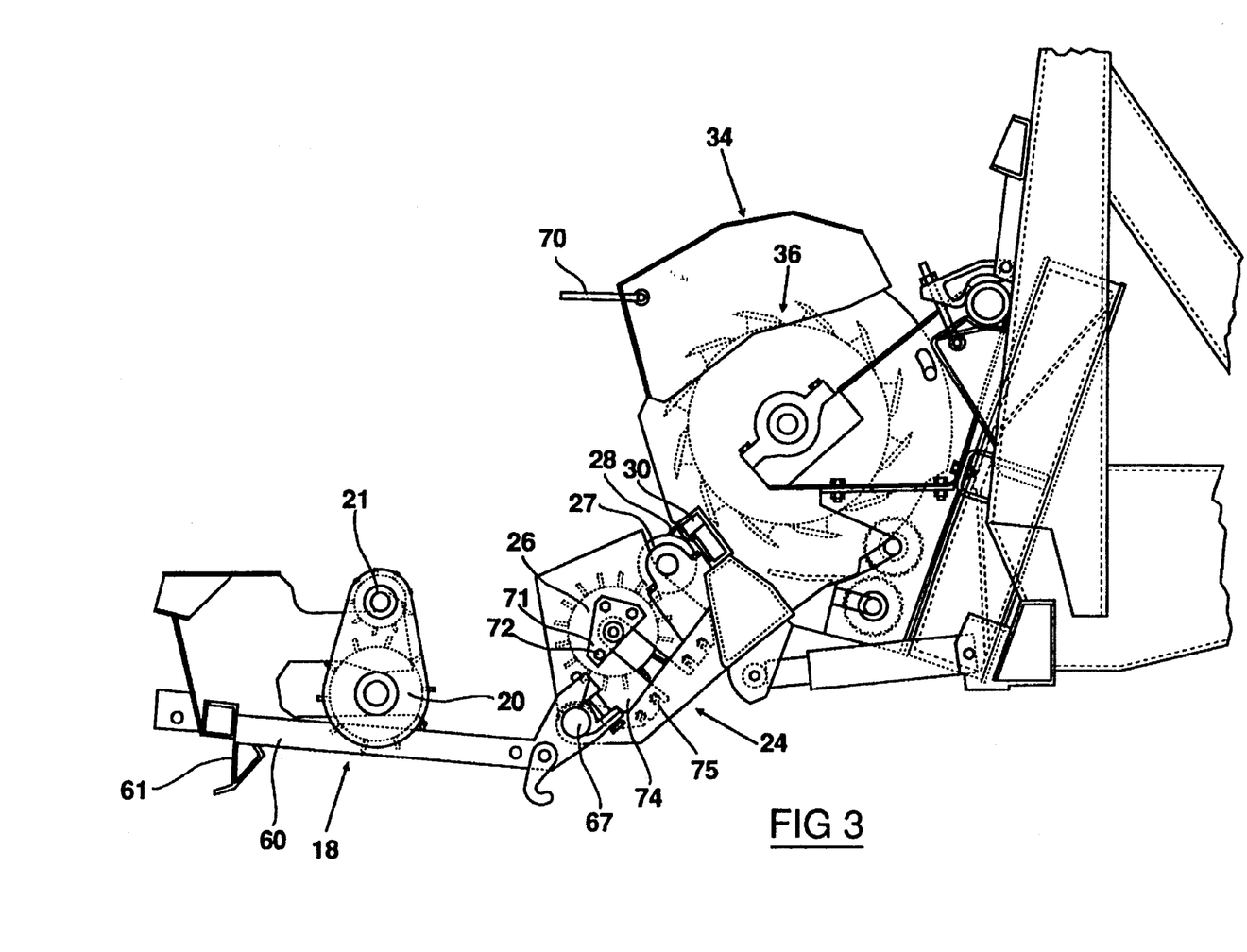
FIG. 3 shows the same front unit, in which the upper feeder frame is pivoted down for access to the cutterhead and lower feeder frame.

When no crop collecting apparatus is attached to the front section 60, access can be gained to the cutterhead 36 and the shearbar 30 by loosening the eyebolts 70 at the top of the upper feeder frame 18 and by tilting the latter forwardly about the cylindric beam 67 as shown in FIG. 3. The top of the front section 60 may rest on the ground or on any kind of support placed in front of the front unit. Any crop material which might have been compressed between the upper and the lower feeder means, will immediately be released and be readily accessible for removal. Direct access is also gained to the upper feedrolls 20, 21, the forward lower feedroll 26, the smooth feedroll 27 and the scraper 28. If required, a person can easily stand in the opening between the upper feedroll 20 and the lower feedroll 26.

As the spring means 55 are tensioned between the front section 60 of the upper feeder frame 18 and the arms 56, which equally are affixed to the frame 18, they are moved in unison therewith, so that there is no need for their disconnection or readjustment when the frame 18 is removed from, respectively reinstalled on the front unit.

When the upper feeder frame 18 is tilted down, the lower feedroll 26 easily can be disassembled from the lower feeder frame 24 by removing the bolts 72 and loosening the bolts 75, whereafter the side plate 74 can be slid in an upward and forward direction over the journal of the feedroll 26 and out of the feeder frame 24. The feedroll 26, together with the bearing plate 71, then can be removed sideways from the feeder frame 24 for replacement or servicing of the feedroll 26 itself or of any enclosed component, e.g. a foreign object detector.

It is also possible to keep the crop collecting apparatus attached to the upper feeder frame 18 and to utilize this apparatus as a support for a separated feeder frame 18. FIG. 4 shows a rear portion of a row crop attachment 10 which has been coupled to the front section 60 of the upper feeder frame 18 by the attachment rest 61 and the hooks 62. The row crop attachment 10 is put to rest on the ground and the feeder frame 18 is detached from the rest of the front unit by loosening the eyebolts 70 at the top and removing the pins 69 from the bifurcated extensions 66 to take away the locks 68. The hooks 62 keep the feeder frame 18 coupled to the row crop attachment 10 while the forage harvester is moved back, so as to give access between the feeder frames 18 and 24.

Access opportunities to the cutterhead 36, the shearbar 30 and the lower feedrolls 26, 27 are similar to those in FIG. 3. The lower forward feedroll 26 can be removed after disassembly of the side plate 74 as described above, when FIG. 3 was considered.

It is also possible to split the front unit without disassembly of the crop collecting apparatus and the locks 68. The row crop attachment 10 remains coupled to the front section 60 by the attachment rest 61 and the hooks 62 while the eyebolts 70 are loosened. The upper feeder frame 18 and the attachment 10 now can be pivoted about the cylindric beam 67. When the row unit 14 is resting on the ground and the hydraulic cylinders 90 are extended so as to raise the lower feeder frame 24, the front unit will open between the top of the cutterhead frame 34 and the upper feeder frame 18. Thus is gained access to the cutterhead 36, the shearbar 30 and the rear feedrolls 21, 27.

Figure 5:
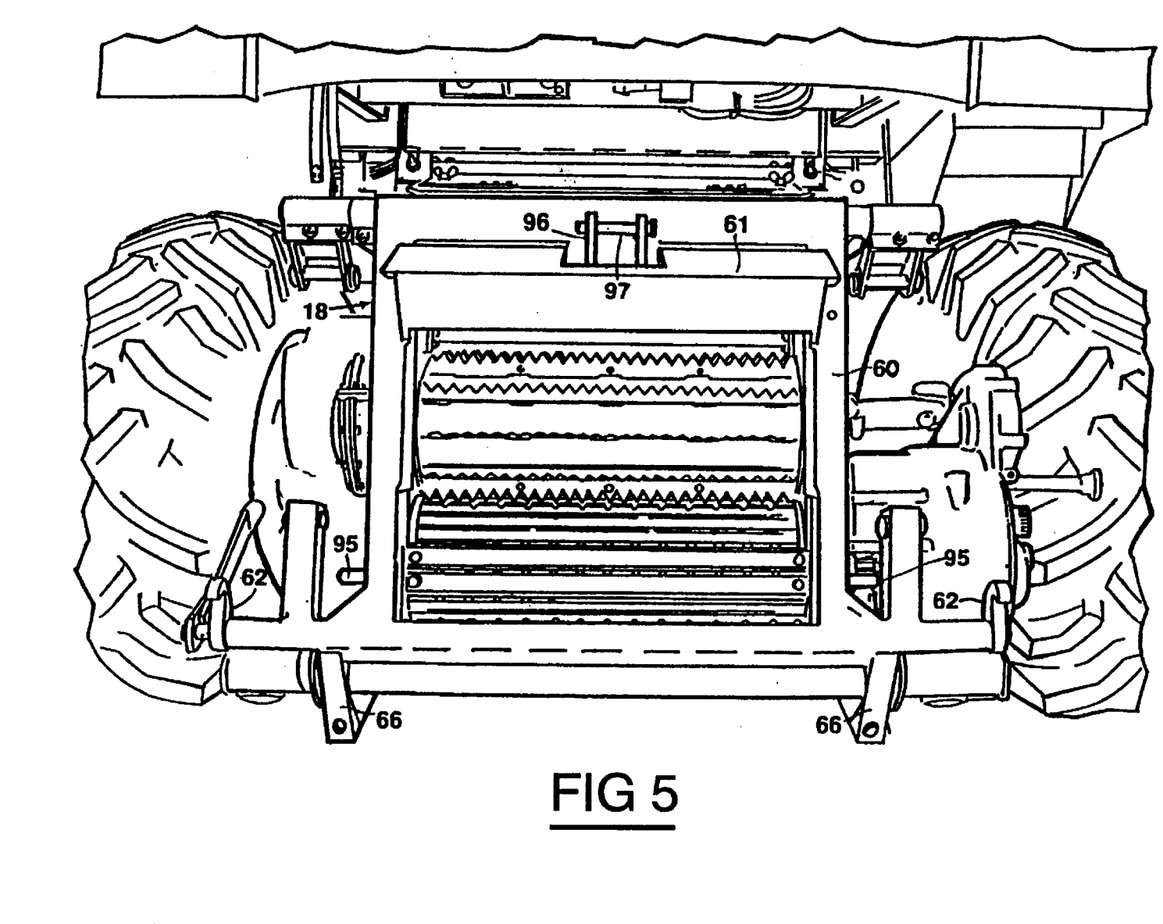
FIG. 5 is a perspective, front view of the front unit with the attachment means for an agricultural tractor.
Figure 6:
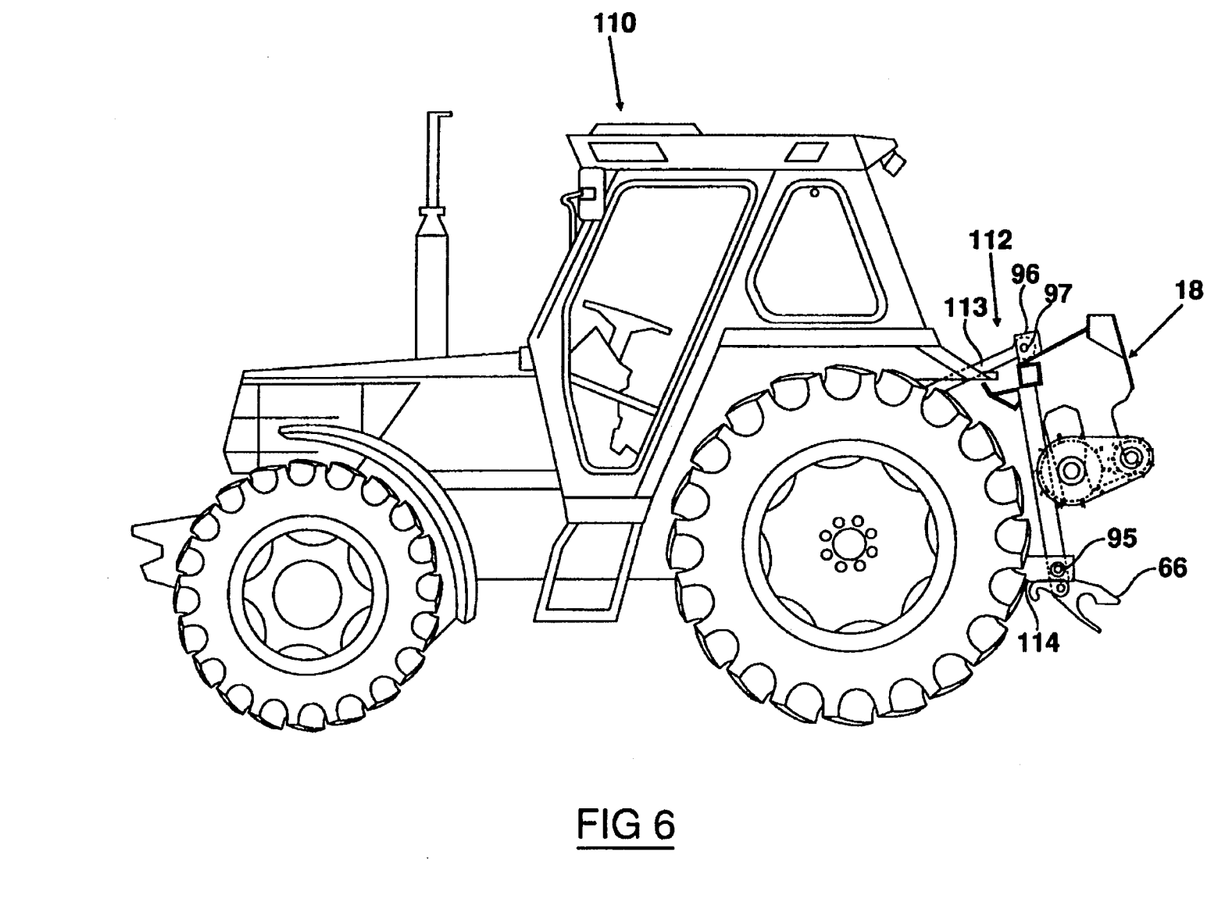
FIG. 6 is a side view of an agricultural tractor carrying the upper feeder frame.

Means for the attachment of the upper feeder frame 18 to an agricultural tractor 110 are shown in FIGS. 2 and 5. These means comprise stub pins 95, welded to the sides of the front section 60, and a removable pin 97 mounted in holes of two vertical plates 96, which are attached to the top of the upper feeder frame 18. In front of these plates 96 a cavity has been provided in the rest 61 in order to enable passage for the upper arm 113 of a three point hitch 112 of the tractor 110. The removable pin 97 links said arm 113 to the plates 96 and the stub pins 95 receive lower arms 114 of the three point hitch 112. After loosening the eye bolts 70 and removing the locking pins 69 and the locks 68, the upper feeder frame 18 can be taken off the front unit of the forage harvester by the tractor 110 as shown in FIG. 6.

Figure 7:
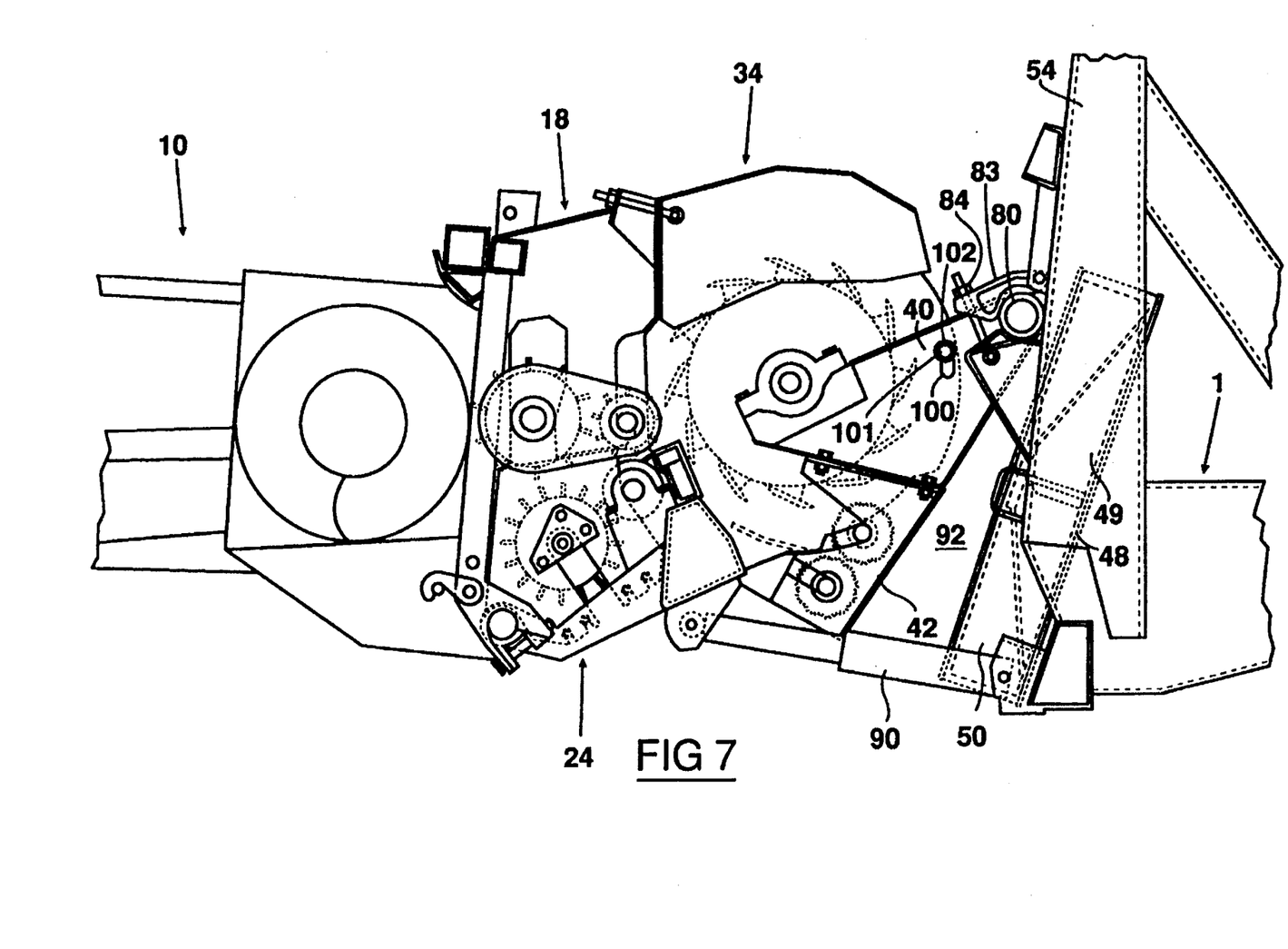
FIG. 7 is a view of the main frame and front unit as in FIG. 2, in which the front unit has been tilted for access to the blower.

As illustrated in FIG. 7, the cutterhead frame 34 can be secured to the cutterhead support 40 by introducing pins 102 through slots 100 in the support 40 and matching holes 101 in the frame 34. After removal of the bolts 87 the front unit, comprising the support 40, the crop processor frame 42, the cutterhead frame 34 and the feeder frames 18, 24, are pivoted upwardly about the cylindric beam 80 by the elongation of the hydraulic cylinders 90. The lower rear portion of the frame 42 is tilted away from the inlet of the blower housing 48 in order to give access to the area 92 inbetween for inspection, cleaning and adjustment of the blower rotor 49 and the blower paddles 50. The attachment 10 may remain coupled to the front unit.

The pins 102 mounted through the cutterhead frame 34 and the support 40 will also prevent that the support 40 pivots down relative the frame 34, when the clamps 83 are opened, the bolts 87 are removed and the hydraulic cylinders 90 are disconnected in order to detach the complete front unit from the forage harvester. The complete front unit may be lifted out of and removed from the main frame 1 by means of the tractor 110, when the three point hitch 112 is connected to the pins 95 and 96 of the front section 60 and the upper feeder frame 18 remains connected to the lower feeder frame 24 and the cutterhead frame. 34.

To the pins 91, which otherwise hold the forward end of the hydraulic cylinders 90, may be mounted a pair of legs (not shown), on which the rear of the front unit can be put to rest by a tractor or any other hoist equipment after detaching the front unit from the main frame 1.

It thus will be appreciated that the construction and interconnection of the various frames 18, 24 and 34 permits good accessability to all the components enclosed within the front unit. It will also be appreciated that no hoist equipment is needed for the splitting and/or opening of the various frames 18, 24 and 34. The hydraulic cylinders 90 of the height control system for the crop collecting apparatus and the forward and rearward movement of the harvester suffice to change the relative position of the frames 18, 24 and 34.

Readily available equipment, such as the crop collecting apparatus or a tractor 110, may be used as a support for separated items, e.g. the upper feeder frame 18.

As the upper and lower feeder means can be displaced relative to one another, any crop material which was compressed therebetween easily can be removed.

Servicing of any apparatus enclosed in the forward lower feedroll 26 is facilitated because it is fastened to a removable side plate 74.

All these features substantially simplify the inspection, cleaning, adjustment and service operations on the forage harvester.

Having thus described the invention, what is claimed is:

1. A forage harvester, comprising
   a main frame (1);
   a cutterhead frame (34) mounted thereto and enclosing a rotatable cutterhead (36), operable to comminute crop material; and
   upper feeder means (20, 21) and lower feeder means (26, 27), operable to convey crop material therebetween towards said cutterhead (36), said lower feeder means (26, 27) being mounted in a lower feeder frame (24), attached to said cutterhead frame (34) and said upper feeder means (20, 21) being mounted in an upper feeder frame (18), attached to said lower feeder frame (24) characterized in that:
   said upper feeder frame (18) is movable between an operative position in which said upper feeder means (20, 21) lie immediately above said lower feeder means (26, 27) and a service position in which said upper feeder means (22, 21) lie remote from the foremost portion (26) of said lower feeder means (26, 27).

2. A forage harvester, according to claim 1, characterized in that the upper feeder frame (18) is movable between an operative position and a service position by pivoting said frame (18) about a horizontal axis (67).

3. A forage harvester, according to claim 2, characterized in that said horizontal axis (67) extends substantially in front of the lower feeder means (26, 27).

4. A forage harvester, according to claim 3, characterized in that said horizontal axis (67) extends substantially below the lower feeder means (26, 27).

5. A forage harvester, according to claim 4, characterized in that the upper feeder frame (18) comprises a front section (60), having means for receiving a registering portion of a crop collecting apparatus (10) and means (61, 62) for securing the same so as to attach it to said front section (60), the latter being pivotally supported by the lower feeder frame (24) at said horizontal axis (67).

6. A forage harvester, according to claim 5, characterized in that said lower feeder frame (24) is supported by an assembly of a cylinder (67) and bifurcated extension (66), which assembly further comprises a removable plug means (68) operable to hold said cylinder (67) within said bifurcated extension (66).

7. A forage harvester, according to claim 1, characterized in that the upper feeder frame (18) is detachable from the lower feeder frame (24).

8. A forage harvester, according to claim 7, characterized in that the assembly of cutterhead frame (34), upper feeder frame (18) and lower feeder frame (24) comprises means (95, 97) for attachment to an agricultural tractor (110).

9. A forage harvester, according to claim 8, characterized in that said attachment means comprises holes and/or pins (95, 97) for attachment to a three point hitch (112) of an agricultural tractor (110).

10. A forage harvester, according to claim 9, characterized in that said attachment means (95, 97) are provided on the upper feeder frame (18).

11. A forage harvester, according to claim 1, characterized in that said lower feeder frame (24) comprises a side section (74) which can be removed for sideways removal of at least a portion (26) of the feeder means (26, 27).

12. A forage harvester, according to claim 11, characterized in that the lower feeder frame (24) comprises a side section (74), which can be removed in an upward direction and in that the lower feeder means (26, 27) comprises a feed roll (26), of which one side is journalled in a bearing support (71), which is removably fastened to said side section (74), and which feed roll (26) can be removed sideways out of said lower feeder frame (24) after removal of the side section (74).

13. A forage harvester, according to claim 12, characterized in that the upper feeder means (26, 27) are forced downwards by spring means (55), which are tensioned between two members (60, 56) attached to the upper feeder frame (18).

14. A forage harvester, comprising
    a main frame (1);
    a cutterhead frame (34), pivotally mounted thereto and enclosing a cutterhead (36), rotatable about a first horizontal axis (39) to thereby comminute crop material;
    upper feeder means (20, 21) and lower feeder means (26, 27), operable to convey crop material therebetween towards said cutterhead (36); and
    means (90) for raising said cutterhead frame (34) relative to said main frame (1), characterized in that:
    said cutterhead frame (34) is mounted to said main frame (1) by means of a cutterhead support (40), which support is journalled for pivoting about a second horizontal axis (80) on said main frame.

15. A forage harvester, according to claim 14, characterized in that said cutterhead support (40) is pivotally connected to a portion (54) of the main frame (1) by clamping members (83) which fit on a cylindric portion (80). portion (54) of the main frame (1) by clamping members (83) which fit on a cylindric portion (80).

16. A forage harvester, according to claim 15, characterized in that said cylindric portion (80) is affixed to the top portion of the cutterhead support (40) and said clamping members (83) are affixed to a portion (54) of the main frame (1).

17. A forage harvester, according to claim 14, characterized in that said cutterhead support (40) is secured from pivoting relative to said main frame (1) by removable hold means (87).

18. A forage harvester, according to claim 17, characterized in that, upon removal of said hold means (87), the cutterhead support (40) is pivotable by the means (90) for lifting and lowering said cutterhead frame (34) relative to said main frame (1).

19. A forage harvester, according to claim 18, characterized in that the lifting and lowering means comprise a hydraulically operated cylinder (90) mounted between said main frame (1) and said cutterhead frame (34).

20. A forage harvester, according to claim 14, characterized in that said cutterhead frame (34) comprises means (100, 101) for securing said frame (34) to said cutterhead support (40) during the pivoting of the latter about the second horizontal axis (80).

21. A forage harvester, according to claim 20, characterized in that said securing means comprises matching holes (100, 101) in both the cutterhead frame (34) and the cutterhead support (40), in which holes (100, 101) fits a transverse pin (102).

* * * * *